*INVENTORS*
ROY A. JENSEN
IRA B. OLDHAM
By John L. Jackson
ATTORNEY

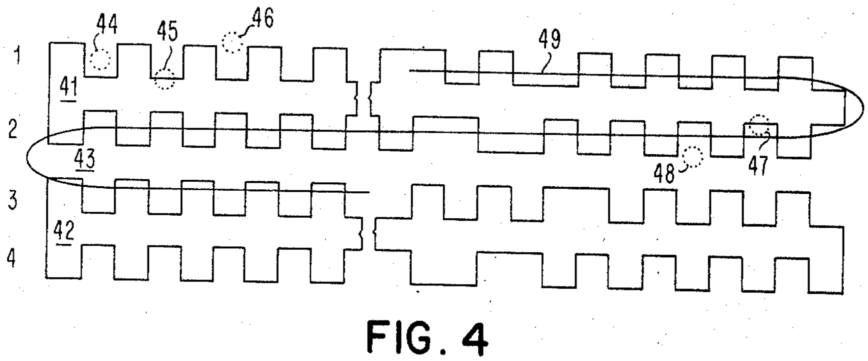
FIG. 4
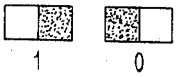
FIG. 3
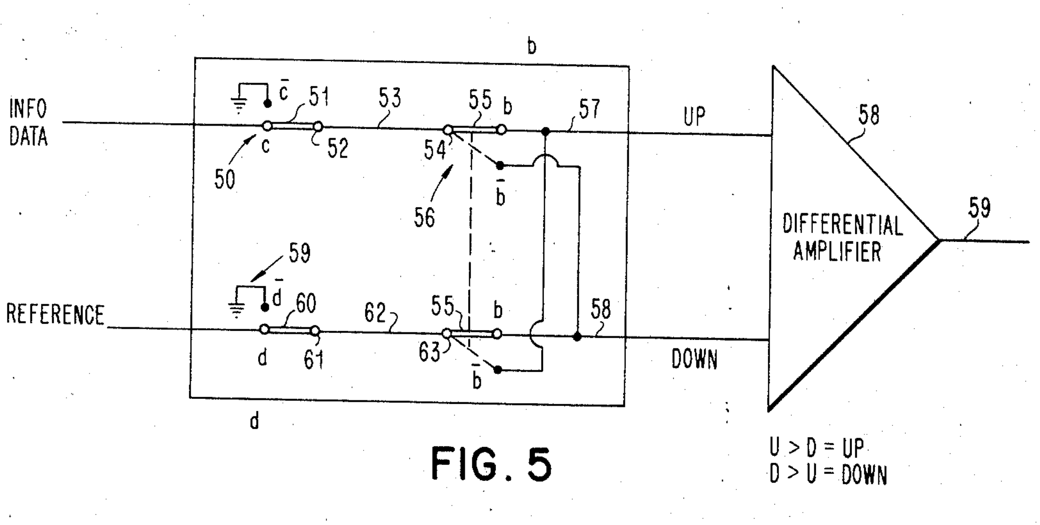
FIG. 5
| TRACKING MODE | INPUT CONDITIONS | SWITCH | | | REQUIRED OUTPUT CONDITIONS |
|---|---|---|---|---|---|
| | | 50 | 59 | 56 | |
| 1 | i > r | c | d | b | U > D |
| 2 | r > i | c | d | b | D > U |
| 3 | i > r | c | d | $\bar{b}$ | D > U |
| 4 | r > i | c | d | $\bar{b}$ | U > D |
FIG. 6
| SWITCHING MODE | SIMULATED INPUT CONDITIONS | SWITCH | | | REQUIRED OUTPUT CONDITIONS |
|---|---|---|---|---|---|
| | | 50 | 59 | 56 | |
| 5 | r > i | c | $\bar{d}$ | b | D > U |
| 6 | i > r | $\bar{c}$ | d | b | U > D |
| 7 | i > r | $\bar{c}$ | d | $\bar{b}$ | D > U |
| 8 | r > i | c | $\bar{d}$ | $\bar{b}$ | U > D |
FIG. 7

United States Patent Office 3,480,919
Patented Nov. 25, 1969

3,480,919
PHOTOGRAPHIC INFORMATION STORAGE OPTICAL TRACKING AND SWITCHING SYSTEM

Roy A. Jensen, San Jose, and Ira B. Oldham, Los Gatos, Calif., assignors to International Business Machines Corporation, Armonk, N.Y., a corporation of New York Filed Nov. 22, 1965, Ser. No. 509,080
Int. Cl. G11b *7/00, 9/00*
U.S. Cl. 340—173 12 Claims

ABSTRACT OF THE DISCLOSURE

A track switching system for use with a photographic storage element. Optical digital information recorded in tracks on a photographic element, is read by a scanning CRT. During scanning, a tracking servomechanism is utilized which is grey level sensitive. The grey level is monitored to supply servo signals to the cathode ray tube to cause the spot to correctly follow the line of information. Each group of two lines of information is separated by an opaque bar and from adjacent groups by a transparent bar so that the grey level signal from the line being scanned will provide an indication as to whether the spot is too high or too low. Too much light will cause the spot to be moved in one direction while a lesser amount of light will cause the spot to be moved in the opposite direction relative to the line of information. By the generation of an apparent tracking error signal this corrective operation is utilized to accomplish the transfer of the scanning spot from one line of information to another line.

This invention relates to servomechanisms in general and more particularly to a tracking servomechanism for tracking on an optical code pattern and upon command changing from one track to another.

In the past, the primary consideration for a memory or store was that it store quantities of information and be capable of retrieving portions of this information rapidly upon demand. Accessing rates were therefore more important than total storage capacity. Additionally, of equal importance, especially in the data processing industry, was the capability of selectively modifying the stored information in accordance with data processing compilations. Thus random access magnetic memories evolved.

It has been recently recognized that certain applications heretofore neglected have need of an extremely large capacity memory. Moreover, many of these applications are amenable to read only memory techniques. The so-called large scale photoscopic store or photographic read only memory has therefore evolved as a complement to the random access magnetic stores. The limitations associated with the read only feature of the large scale photographic memories have proven to be more than offset by its economy. One prior art large scale photographic storage system is shown in U.S. Patent 2,843,841 entitled "Information Storage System" by G. W. King et al. In the King system, the large scale read only photographic memory is used in conjunction with a magnetic. memory Changes to the read only information contained in the large scale photographic store are recorded and stored in the magnetic memory.

As previously stated, one of the main reasons for selecting a photographic store is that the cost per bit stored is quite low as compared to a magnetic store. This is in a large part brought about by the fact that the available recording densities on a photographic storage medium are quite high. For instance, recording densities of 1500 bits per inch and 1500 lines per inch have been well within the art for a number of years. With these high recording densities, many reading and accessing problems are however presented. At these densities, it becomes imperative that the reading beam of light track closely on the track being read since a slight deviation would cause the beam to move to an adjacent track and thereby read erroneous information or provide an otherwise unusable output signal due to poor signal to noise characteristics. A second requirement is that the reading beam of light be capable of movement from track to track rapidly upon command. As will be appreciated by one skilled in the art, at 1500 lines per inch, close control during track switching is necessary to prevent multiple skips, etc. In the aforementioned King system, a current pulse is applied to the deflection plates of a scanning CRT to cause the beam to kick out from the track being scanned into a transparent area between the tracks and the track servo sense reversed to cause the beam to move to the next track. While this type of track changing system is highly suited for use in photographic storage systems wherein the tracks are not closely spaced, it is not suited for use in a photographic storage system wherein the tracks are very closely spaced. Disadvantages of this system are that it is likely to pick up stray pulses which could cause undesired track changes and multiple track changes when a single change is desired. Additionally, in the system itself nothing can be done to make it insensitive to transients since it is impulse oriented. Finally, as will be appreciated, for control purposes, it is desirable that the scanning spot be under linear control which is not the case where the impulse technique is used.

An object of the present invention is to provide a novel tracking and track change servo system.

It is another object of the present invention to provide a new photographic tracking and track change system for utilization in a large scale photographic storage system.

Another object of the present invention is to provide a novel track change method for utilization in a large scale photographic storage system wherein the scanning spot is always under linear control and track changes depend upon the associated servo seeking a null position rather than being dependent on the amplitude of a pulse.

Another object of the present invention is to provide a new device for switching from track to track in a photographic storage system by causing a differential amplifier to see an effective total black or total white signal relative to the average light level falling on an information photomultiplier tube or a reference photomultiplier tube depending upon the direction of the track to be moved to and whether an odd or even numbered track was being scanned prior to track change.

Other and further objects and advantages of the invention will be apparent from the following more particular description of the preferred embodiment of the invention as illustrated in the accompanying drawings in which:

FIG. 3 is an illustration of a code which may be utilized in the herein described system;

FIG. 4 is a view of four tracks of information and an exemplary path of the scanning beam during scanning and track change;

FIG. 5 is a schematic representation of the servo switch of the system of FIG. 2;

FIG. 6 is a table showing various inputs to the switch of FIG. 5 to cause tracking of the scanning spot;

FIG. 7 is a table showing various inputs to the switch of FIG. 5 to accomplish switching from track to track.

Figure 1:
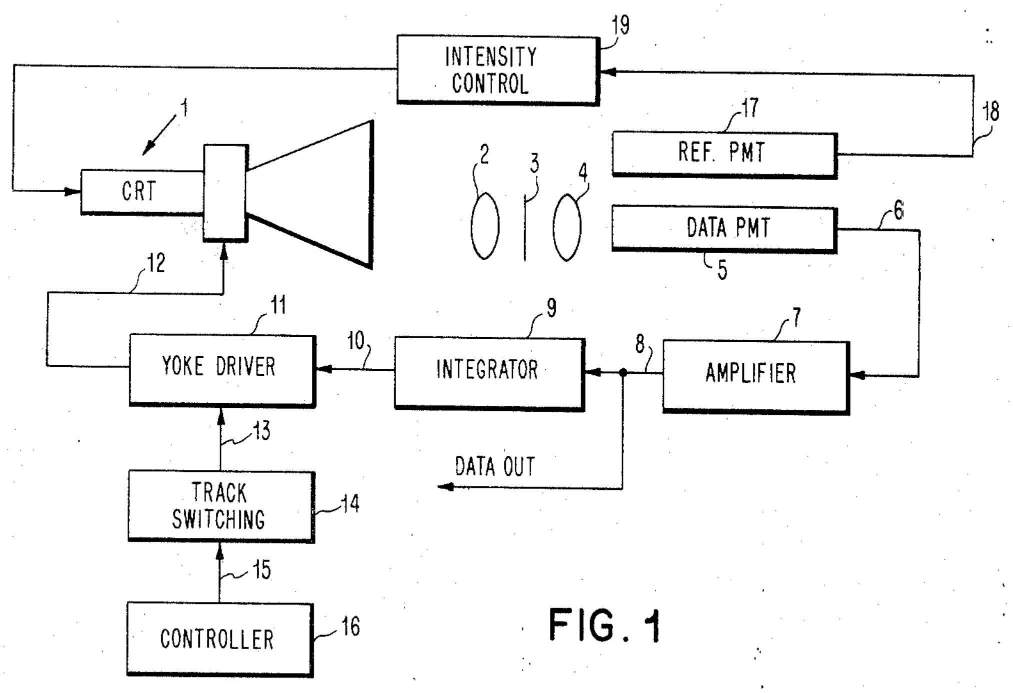
FIG. 1 is a block diagram of a typical prior art CRT scanning system.

In the following description, the subject novel tracking and track switching system will be described in a photographic store application; however, it will be apparent to those skilled in the art that the herein described techniques are readily applicable to other types of storage such as thermoplastic and magnetic.

Briefly, in the preferred embodiment of the subject system, optical digital information is recorded in lines or tracks and information is extracted in the preferred embodiment, for instance, by scanning the uppermost row from left to right and the next row from right to left, the next row from left to right, etc.

During the scanning of a line, a tracking servomechanism is utilized which is grey level sensitive. A grey level sensing technique may be used since the information is recorded on the storage media in a combination of opaque and transparent bits such in each line there is an equal number of opaque and transparent bits. Two lines of code are recorded back to back and are separated by an opaque bar. When the scanning spot is properly centered relative to the line being scanned, a predictable grey level is generated since there is an equal number of transparent and opaque bits. This grey level is monitored to supply servo signals to a cathode ray tube to cause the spot to correctly follow the line of information. Since each group of two lines of code and opaque bar are separated from adjacent groups by a transparent bar, the grey level signal from the line being scanned will provide an indication as to whether the spot is too high or too low. Too much light will cause the spot to be moved in one direction while a lesser amount of light will cause the spot to be moved in the opposite direction relative to the line of information.

Two photomultiplier tubes are utilized: a data PMT on which the light from the CRT spot as modulated by the code being scanned is imaged and a reference PMT on which unmodulated light from the CRT is imaged. The outputs from the data PMT and the reference PMT are passed through a servo switch into a differential amplifier which provides a directionalized output to the CRT deflection circuitry to cause the scanning spot to move in the necessary direction to cause the spot to be centered on the midpoint of the track being scanned. The output from the differential amplifier is passed through an integrator or filter prior to being fed to the CRT deflection control circuitry so that the data is stripped from the amplifier output signal and a directionalized DC level remains. The data out is taken directly from the output of the differential amplifier. The output of the differential amplifier is caused to be in the necessary direction by the servo switch which is under control of a controller. The controller acting upon the servo switch causes the outputs of the reference PMT and the data PMT to be selectively switched between the input terminals of the differential amplifier in accordance with whether an odd or even numbered track is being scanned. Also to accomplish track change, the servo switch under control of the controller causes one input line to the differential amplifier to be grounded relative to the other input line to which is being applied data signals from the data PMT or the reference signals from the reference PMT.

Refer first to FIG. 1 wherein is shown a typical prior art CRT scanning system. A cathode ray tube generally designated at 1 has its spot imaged by means of a lens 2 onto a film 3 on which is recorded data to be scanned. The light from the CRT as modulated by the data on the film 3 is imaged by means of a lens 4 onto a data PMT 5. The output from the data PMT 5 is passed along line 6 to the input of an amplifier 7. The amplified data passes out of the amplifier 7 along line 8 into an integrator 9 and onto a data output line. In the integrator 9, the data is stripped from the amplified signal to provide a DC signal along line 10 to a yoke driver 11. The output from the yoke driver 11 passes along line 12 to the yoke of the CRT to cause the beam to move vertically and horizontally. Also connected to the yoke driver 11 along the line 13 is track switching circuitry 14 which in turn is controlled along line 15 by the controller 16. As previously mentioned, the track switching circuitry may provide, as in the aforementioned King system, impulses along line 13 to cause the beam to skip from track to track.

Also in optical association with the light from the CRT is a reference PMT 17 which is connected along line 18 to intensity control circuitry 19. The intensity control circuitry 19 is operative upon the signal from the reference PMT 17 to accomplish intensity control of the CRT to provide uniform spot intensity.

The output signal from the integrator 9 is indicative that the instantaneous grey level in the output signal from the integrator will be in one direction if too much light is received and will be in the opposite direction if too little light is received. This type of system is well-known and a more detailed description will be found in the aforementioned King patent.

Figure 2:
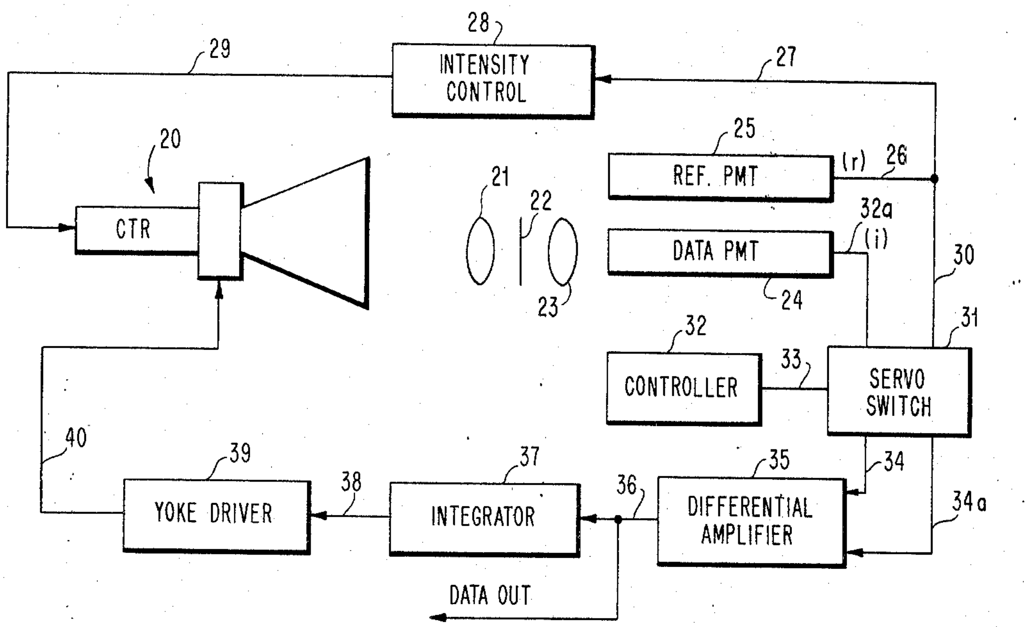
FIG. 2 is a block diagram of the herein described novel photographic scanning and track change system.

Refer next to FIG. 2 wherein is shown a block diagram of the subject novel optical tracking and switching system. A CRT designated generally at 20 has the light from its spot imaged by means of a lens 21 onto a film 22. The light from the CRT as modulated by the code pattern on the film 22 is imaged by means of a lens 23 onto a data PMT 24. Also in optical association with the spot of the CRT 20 is a reference PMT 25. The output ($r$) of the reference PMT is passed along lines 26 and 27 to an intensity control means 28 which is operative along line 29 to vary the intensity of the spot to compensate for voltage fluctuations, phosphorous inconsistencies, etc. The output from the reference PMT 25 is also fed along line 30 to the input of a servo switch 31.

The output ($i$) from the data or information PMT 24 is fed along line 32$a$ to the input of the servo switch 31. The servo switch 31 is controlled by means of a controller 32 along line 33 as will hereinafter be described in more detail. Functionally, the controller provides control signals to the servo switch in accordance with whether the beam is scanning an odd or even numbered line of information; scanning from right to left or left to right; and provides control signals to effect track change. The output from the servo switch 31 passes along lines 34 and 34A into a differential amplifier 35. The output of the differential amplifier 35 is fed along line 36 into an integrator 37 and to the data out line. The DC level from the integrator 37 is fed along line 38 into the yoke driver 39 which provides an output control signal along line 40 to the yoke of the CRT 20 to cause vertical and horizontal movement of the spot.

It will be appreciated by those skilled in the art that while in the preferred embodiment track switching is accomplished by causing the scanning beam to move such that, while the data PMT remains stationary and effective track change is made and that the herein described techniques are equally applicable where a conventional transducer such as a magnetic head is physically moved relative to the tracks. Likewise, the techniques are applicable where the transducer is held stationary and the date member moved relative to it.

In operation, the controller 32 furnishes a signal along line 33 to the servo switch 31 to control the application of the signal from the reference PMT 25 and the data PMT 24 to the differential amplifier 35. As will later become more apparent from a consideration of the code utilized, during tracking if the signal from the data PMT becomes too black relative to the reference PMT signal when tracking from right to left, the spot must be caused to go up while when tracking from left to right, the spot must be caused to go down. A convenient way of accomplishing this spot control as will later be described in mor detail in conjunction with FIGS. 5, 6 and 7 is to reverse the inputs to the differential amlpifier 35 from the PMT's 24 and 25. Thus, the servo switch 31 is operable under control of the controller 32 to accomplish selective switching of the reference PMT and the data PMT outputs to the differential amplifier 35. Moreover, again as will be described in more detail in conjunction with FIGS. 5, 6 and 7, the servo switch is operative under control of the controller 32 to cause one of the inputs to the differential amplifier 35 to be grounded relative to either the reference PMT signal (*r*) or the data PMT signal (*i*) to cause track change. In this maner the combination of the servo switch controller and differential amplifier serves as switching means for regulating the position of the spot scan.

The output from the differential amplifier 35 is passed into the inegrator 37 wherein the data is stripped from the output signal of the differential amplifier 35 and converted into a directionalized DC signal to accomplish vertical tracking control over the scanning spot. For purposes of discussion assume that a positive level from the integrator 37 will cause the spot to move up while a negative level will cause the spot to move down. Thus, the operation of the servo switch in conjunction with the signals from the reference PMT 25 and the data PMT 24 must provide a directionalized output signal at the output of the differential amplifier 35 to cause the scanning spot to move up or down for tracking or track change.

Referring next to FIG. 4 wherein is shown the code which is utilized in the subject system. In FIG. 3 is shown a 1 and a 0. The 1 consists of a transparent bit followed by an opaque bit, while the 0 consists of an opaque bit followed by a transparent bit. Thus, in considering a given line of code, it wil be seen that there are an equal number of transparent and opaque bits such that a grey level control can be effected. This type of coding and its positive attractive features have been more fully described in the King patent. In FIG. 4 is shown the particular way of recording lines of code such that grey level servoing can be effected. The information is recorded in lines of opaque and transparent bits. Two lines of information are separated by an opaque bar. Lines 1 and 2 are separated by the opaque bar 41 and lines 3 and 4 are separated by the opaque bar 42. Each group of two lines of information separated by the opaque bar are separated from adjacent groups by a transparent bar. The groups comprising lines 1–2 and 3–4 are separated by an opaque bar 43.

For purposes of illustration, assume that the data is recorded such that the scaning of an odd numbered line must take place from left to right and the scanning of an even numbered line must take place from right to left. Consider first the scanning of line 1. As the scanning spot moves along line 1, it should be ideally in the position relative to the code pattern as illustrated by spot 44. Thus, the overall output grey level from the scanning spot 44 will be a true grey level without either too much black or to much white. However, if the spot falls into the position as depicted by spot 45, the overall output will contain too much black and the spot must be moved up. Moreover, if the spot is in the position as depicted by spot 46, the overall output level will contain too much light and the spot must be moved down. Considering line 2, the opposite is true. If the spot in the position as depicted by spot 47, the overall grey level will contain too much black and the spot must be moved down, while if the spot were in the position as depicted by spot 48, the overall grey level will contain too much light and the spot must be moved up.

Thus, the following tracking control statements can be formulated:

(1) When tracking an odd numbered track (from left to right) if an excess of black, go up.

(2) When tracking an odd numbered track (from left to right) if an excess of white, go down.

(3) When tracking an even numbered track (from right to left) if an exces of black, go down.

(4) When tracking an even numbered track (from right to left) if an excess of white, go up.

Also, following track switching control statements can be made:

(5) When scanning an odd track to switch from a lower even track, go down.

(6) When scanning an odd track to switch to an upper even track, go up.

(7) When scanning an even track to switch to a lower odd track, go down.

(8) When scanning an even track to switch to an upper odd track, go up.

In the following discussion, a 0 v. PMT output will be indicative of total black while a −4 v. PMT output will be indicative of full light and the desired grey level is −2 volts.

As was previously discussed, one of the desired characteristics of a track change scheme is that it not be dependent on impulses to accomplish track switching so that the system can be made insensitive to transients and, additionaly, it is desirable for control purposes to maintain linear control on the spot during track changes. In the subject system, the track changing is accomplished by generating an apparent tracking error by clamping one of the inputs of the differential amplifier to ground to cause its output to be in the desired direction. The servo switch must, therefore, not only control the spot during tracking but must, additionally, be operative to clamp the effective output from the PMT's relative to each other so that the inputs to the differential amplifier are such that the spot wil be moved in the required direction.

Refer next to FIG. 5 wherein is shown a schematic of a servo switch which can be controlled with three switch inputs C, D and B to accomplish not only tracking but, additionally, track switching. Tables are shown in FIGS. 6 and 7 which describe the input conditions, switch conditions and required output conditions to accomplish control of the spot. In FIG. 6, the tracking mode numbers 1, 2, 3 and 4 tie into the tracking control statements previously made while the switching mode numbers 5, 6, 7 and 8 tie into the switching control statements previously made.

In FIG. 5 is shown an information or data line coming from the data PMT and a reference input line coming from the reference PMT. The information line is connected to the C terminal of a switch designated generally at 50. The $\bar{c}$ terminal switch 50 is grounded. A movable switch element 51 is operable to connect the information line or the grounded terminal $\bar{c}$ to terminal 52 which in turn is connected along line 53 to terminal 54. Terminal 54 is connected to the upper moving element 55 of a double pole switch designated generally at 56. The upper element 55 is operative to connect terminal 54 with the *b* and $\bar{b}$ terminals. The upper *b* terminal and the lower *b* terminal of the double pole switch 56 is connected along lines 57 and 58, respectively, to the *u* input terminal and

*d* input terminal, respectively, of the differential amplifier 58. The upper $\bar{b}$ and the lower $\bar{b}$ terminals of the double pole switch 56 are connected to the D and U input lines, respectively, of the differential amplifier 58. The reference input line is connected to the *d* terminal of the switch designated generally at 59 while its $\bar{d}$ terminal is grounded. The movable switch element 60 of switch 59 is connected to terminal 61 which in turn is connected along line 62 to the fixed terminal 63.

The output of the differential amplifier 58 is passed along line 59.

In the following discussion, when the U inut line to the differential amplifier 58 has a higher potential on it than the D input terminal, the potential on line 59 will be such that the beam spot will be driven up while when the D input terminal has a higher potential on it then the U input potential will be driven down. The servo switch of FIG. 5 is merely for purposes of simplicity of explanation and in a sophisticated scheme, such a cumbersome arrangement will not be used. A more practical solid state switch to accomplish the functions of the servo switch of FIG. 5 will hereinafter be provided.

In tracking mode 1, which is the case where the spot is moved on an odd track from left to right and too much black is encountered, the spot must be moved up. Consider the chart of FIG. 6, the required output conditions are that U must be greater than D when the input conditions are (*i*) is greater than (*r*) which is the case when too much black is detected. To aid in understanding the charts of FIGS. 6 and 7, it should be remembered that the black or opaque outputs of the PMT's are the equivalent of 0 v., the transparent output of the PMT is −4 v. and the desired grey level or reference level is −2 volts. For example, if too much black appears relative to the reference level when scanning an odd track from right to left, the outputs from the PMT will be for instance, *i*=−1 v. and *r*=−2 volts. In this case, the switches 50, 59 and 56 must be in the *c, d, b* positions. With the switches in the *c, d, b* positions and (*i*) greater than (*r*), the U input terminal to the differential amplifier 58 has a greater potential on it than is on the D input terminal. The output of the differential amplifier along line 59 will therefore cause the beam to move up.

With respect to tracking mode 2 which is the case where the spot is moved on an odd track from left to right and too much white is encountered (*r*) is greater than (*i*), the required output conditions are that D is greater than U. Again, with these input conditions and switches 50, 59 and 56 in the *c, d, b* positions, the input to the differential amplifier 58 will be such that D is higher in potential than U. Therefore, the output on line 59 drives the beam down.

In tracking mode 3 which is the case where the spot is moved along an even numbered track from right to left and too much black is encountered (*i* is greater than *r*), the D input to the differential amplifier must be greater than U to drive the beam down. Consideration of the servo switch of FIG. 5 will show that when the switches 50, 59 and 56 are in the *c, d,* $\bar{b}$ positions that the greater input (*i*) is applied to the D input terminal of the amplifier and the lesser input (*r*) is applied to the U input of amplifier 58. Thus, the beam will be driven down.

With respect to tracking mode 4 which is the case where the spot is moved along even numbered tracks from right to left and too much white is received, the spot must be moved up. Consideration of the servo switch of FIG. 5 will show that with switches 50, 59 and 56 in the *c, d,* $\bar{b}$ position that the larger input (*r*) is applied to the U input terminal of the amplifier and the lesser input (*i*) is applied to the D input terminal of the amplifier and the beam will move up.

In FIG. 7 is shown a table describing the input conditions and necessary switch positions to accomplish the required output conditions for the track switching modes of operation. In switching mode case 5 wherein track switching is to be made from an odd track to a lower even track, the required output conditions to the differential amplifier are that D is greater than U. Considering FIG. 5, the D input to the amplifier will be made larger by making the reference larger than the information data input. This is accomplished by moving switch 59 to the $\bar{d}$ position to cause the D input to the differential amplifier to be grounded. The output of the differential amplifier on line 59 will thus be such that the beam will be driven down.

In switching mode 6 which is the case wherein switching is to be made from an odd track to an upper even track, the spot must be moved up. Thus, the U input to the amplifier must be greater than the D input. This is accomplished by setting switches 50, 59 and 56 in the $\bar{c}$, *d, b* positions. Similarly, switching mode cases 7 and 8 are obtained by setting the switches 50, 59 and 56 to the $\bar{c}$, *d* $\bar{b}$ and *c*, $\bar{d}$, $\bar{b}$ positions, respectively.

Figure 8:
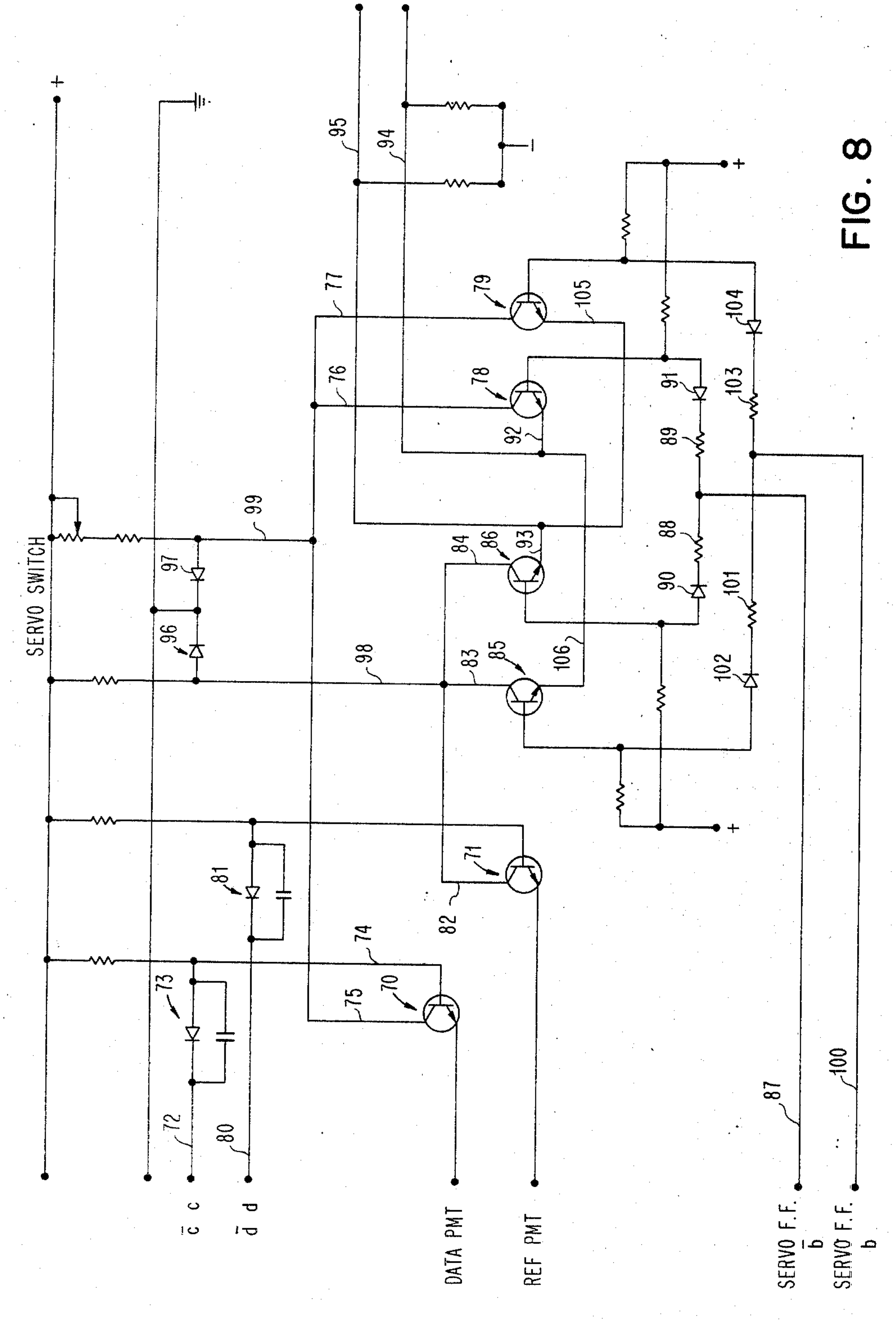
FIG. 8 is a detailed schematic diagram of the servo switch of FIG. 2.

Refer next to FIG. 8 wherein is shown a schematic of solid state circuitry for performing the functions of the servo switch of FIG. 5. As previously stated, the servo switch would be unsuitable for use in an automated system. Hence, the circuitry of FIG. 8 is provided which may be controlled to accomplish the switching previously described under control of 6 inputs: *c*, $\bar{c}$, *d*, $\bar{d}$, *b*, $\bar{b}$. In FIG. 8, NPN transistors are used as switches. The transistors, generally designated at 70 and 71, correspond to switches 50 and 59, respectively. In the following discussion, two logical levels will be used for purposes of illustration. A 1 logical level equal 0 v. while a 0 logical level equals −6 volts. Biasing potentials and component values in the circuit of FIG. 8 are not set forth since the operation of the transistors is stratightforward. A 0 potential applied to the base of the transistors will turn them on while a −6 v. to the base will turn them off.

Application of a negative potential along line 72 through the diode 73 will pass along line 74 to the base of the transistor 70 to turn it on. The line 72, when a 0 logical level or −6 v. is applied to it, holds the transistor 70 off. The collector of transistor 70 therefore swings with the emitter such that the data from the data PMT passes along the collector line 75 into lines 76 and 77 which are connected to the collectors of transistors 78 and 79, respectively. Likewise, the application of a 1 logical level to line 80 (0 v.) turns on transistor 71 through diode 81. Again, the collector line 82 of transistor 71 will swing with the r.p.m. input which is applied to its emitter and thereby cause lines 83 and 84 which are connected to the collector of transistors 85 and 86, respectively, to swing with the r.p.m. input signal.

Application of the 1 or 0 logical level to the *b* line 87 will act through resistors 88 and 89 and diodes 90 and 91 to turn on transistors 86 and 78 by application of a substantially 0 potential to their bases. With the transistors 86 and 87 turned on, the data PMT signal applied to the collector of transistor 78 and the reference PMT signal applied to the collector of transistor 87 will be passed to their respective emitter lines 92 and 93 and thence to the output lines 94 and 95, retspectivetly. This, of course, is the case only if the C and D inputs are at the 1 logical level. Otherwise, if either C or D is at the 0 logical level, its associated transistor will have its collector grounded through diodes 96 and 97 which are connected to the collectors of transistors 71 and 70, respectively, along lines 82, 98, 75 and 99. Thus, removal of the 0 potential from lines 72 or 80 will cause its associated transistor to have its collector grounded which in effect grounds the input to the associated transistors 78, 79, 85 and 86.

Application of a 0 potential along the line 100 will cause transistor 85 to be turned on through resistor 101 and diode 102 and transistor 79 to be turned on through resistor 103 and diode 104. Thus, any input to the transistors 79 and 85 through their collectors will be passed along the emitter lines 105 and 106, respectively, onto the output lines 95 and 94 to which they are connected.

Thus, through selective energization of the inputs to lines $c$, $\bar{c}$, $d$, $\bar{d}$, $b$, $\bar{b}$, the functions of the servo switch of FIG. 5 can be provided.

Summarizing the operation of the circuit of FIG. 8, application of a 0 v. potential to the C and D lines 72 and 80 will cause the transistors 70 and 71, respectively, to pass the data and reference PMT signals. Removal of the 0 potential will cause the collectors of transistors 70 and 71 to go to ground thereby effectively grounding, as in the schematic of FIG. 5, the inputs to the $b$ and $\bar{b}$ switches. Then, as previously described, application of a 0 potential to either the $b$ or $\bar{b}$ line will cause the respective B and $\overline{B}$ transistors to operate to thereby effectively pass either the data PMT signal of ground to the output lines 94 and 95 which are connected to the differential amplifier.

The $c$, $\bar{c}$, $d$, $\bar{d}$, $b$, $\bar{b}$ inputs control whether or not the data and reference signals are passed or whether the effective output from the data or reference PMT is a 0 volts. While, as in the servo switch of FIG. 5, the $b$ or $\bar{b}$ inputs serve to switch the outputs from the data PMT or reference PMT lines between the inputs 94 and 95 of the differential amplifier.

In summary, the preferred embodiment of the subject invention records optical digital information in lines or tracks and information is extracted in the preferred embodiment, for instance, by scanning the uppermost row from left to right and the next row from right to left, the next row from left to right, etc.

During the scanning of a line, a tracking servomechanism or means for providing servo signals 24, 25, 31, 35 and 37 is utilized which is grey level sensitive. A grey level sensing technique may be used since the information is recorded on the storage media in a combination of opaque and transparent bits such that in each line there is an equal number of opaque and transparent bits. Two lines of code, line 1 and line 2, are recorded back to back and are separated by an opaque bar 41. When the scanning spot is properly centered relative to the line being scanned, a predictable grey level is generated since there is an equal number of transparent and opaque bits. This grey level is monitored to supply servo signals to a cathode ray tube 20 to cause the spot to correctly follow the line of information. Since each group of two lines of code and opaque bar are separated from adjacent groups by a transparent bar, the grey level signal from the line being scanned will provide an indication as to whether the spot is too high or too low. Too much light will cause the spot to be moved in one direction while a lesser amount of light will cause the spot to be moved in the opposite direction relative to the line of information.

Two photomultiplier tubes are utilized: a data PMT 24 on which the light from the CRT spot 20 as modulated by the code being scanned is imaged and a reference PMT 25 on which unmodulated light from the CRT is imaged. The outputs from the data PMT and the reference PMT are passed through a servo switch 31 into a differential amplifier 35 which provides a directionalized output to the CRT deflection circuitry to cause the scanning spot to move in the necessary direction to cause the spot to be centered on the midpoint of the track being scanned. The output from the differential amplifier 35 is passed through an integrator or filter 37 prior to being fed to the CRT deflection control circuitry so that the data is stripped from the amplifier output signal and a directionalized DC level remains. The data out is taken directly from the output of the differential amplifier. The output of the differential amplifier is caused to be in the necessary direction by the servo switch 31 which is under control of a controller 32. The controller acting upon the servo switch causes the outputs of the reference PMT and the data PMT to be selectively switched between the input terminals of the differential amplifier in accordance with whether an odd or even numbered track is being scanned. Also to accomplish track change, the servo switch 31 under control of the controller 32 causes one input line to the differential amplifier 35 to be grounded relative to the other input line to which is being applied data signals from the data PMT 24 or the reference signals from the reference PMT 25.

While the subject invention has been described in an application, it will, of course, be obvious to those skilled in the art that the techniques taught herein of track change could be employed in other types of storage systems, such as magnetic stores, to control track change.

We claim:

1. In a storage system wherein data is stored in tracks on a record member, a tracking and track switching system wherein a transducer is in operable association with one of said data tracks comprising:

means for causing relative movement between said transducer and said data;

a transducer positioning means; and means for providing servo signals to said transducer positioning means to cause said transducer to track on said one data track means; including:

switching means for effectively moving said transducer from track to track by clamping selected servo signals to ground thereby causing the positioning means to compensate for an apparent tracking error and alter the position of the transducer in the direction of the new track desired to be read.

2. The storage system of claim 1 wherein said transducer is a light source and a photomultiplier and said data is recorded optically.

3. The storage system of claim 2 wherein relative movement between said transducer and said data is effected by movement of said record member.

4. The storage system of claim 2 wherein relative movement between said transducer and said data is effected by moving said light source.

5. The storage system of claim 4 wherein said light source is a cathode ray tube.

6. The storage system of claim 1 wherein said means for providing servo signals includes means for generating a signal indicative of the relative position of said transducer and said one track operable to provide a tracking error signal to said transducer positioning means.

7. The storage system of claim 6 wherein said tracking error signal is generated by comparing the data signal from said transducer with a reference signal indicative of the midpoint of the data being scanned.

8. The storage system of claim 7 wherein said transducer is a cathode ray tube and a photomultiplier, said reference signal is generated by a photomultiplier in optical association with said cathode ray tube and said data is recorded optically.

9. The storage system of claim 7 wherein said reference signal is generated by a photomultiplier in optical association with said cathode ray tube and said data is recorded such that when a data track is being scanned on one side of its midpoint, a DC level of a first polarity relative to said reference signal is generated and when said data track is being scanned on the other side of its midpoint, a DC level of a second polarity relative to said reference signal is generated to provide, in the event of deviation from the midpoint scan, a directionalized error signal.

10. The storage system of claim 9 wherein said DC levels and said reference signals are input to a differential amplifier which provides said directionalized error signal to said transducer positioning means.

11. The storage system of claim 10 wherein said switching means for moving said transducer effectively from track to track includes servo switching means for selectively providing signals to said differential amplifier of an appropriate polarity relative to said reference signal to cause said differential amplifier to provide a controlled directionalized error to said transducer positioning means.

12. The storage system of claim 11 wherein said differential amplifier has two input lines and said servo switching means is selectively operable during tracking and track switching to switch said DC level and said reference signals between the input lines of said differential amplifier.

References Cited

UNITED STATES PATENTS

| | | | |
|---|---|---|---|
| 2,575,445 | 11/1951 | Germer | 179—100.3 |
| 2,843,841 | 7/1958 | King et al. | 340—173 |
| 3,292,168 | 12/1966 | Gray | 340—174.1 |

BERNARD KONICK, Primary Examiner

J. F. BREIMAYER, Assistant Examiner

U.S. Cl. X.R.

179—100.3; 250—202, 219